United States Patent [19]

Kramer et al.

[11] Patent Number: 4,814,370

[45] Date of Patent: Mar. 21, 1989

[54] $CO_2$ COPOLYMER CERAMIC-BINDER COMPOSITION

[75] Inventors: Daniel P. Kramer, Macungie; Joseph G. Santangelo; James J. Weber, both of Allentown, all of Pa.

[73] Assignee: Air Products and Chemicals, Inc., Allentown, Pa.

[21] Appl. No.: 144,833

[22] Filed: Jan. 15, 1988

Related U.S. Application Data

[62] Division of Ser. No. 7,233, Jan. 27, 1987.

[51] Int. Cl.[4] .......................... C08K 3/34; C08K 3/22; C08K 3/14
[52] U.S. Cl. .................................. 524/391; 524/413; 524/430; 524/435; 524/443; 524/445; 524/446; 524/456; 524/612
[58] Field of Search ............... 524/612, 391, 413, 430, 524/435, 443, 445, 446, 456

[56] References Cited

U.S. PATENT DOCUMENTS

| | | | |
|---|---|---|---|
| 3,706,713 | 12/1972 | Hull et al. | 528/405 |
| 4,409,322 | 10/1983 | Ezaki et al. | 430/523 |
| 4,633,929 | 1/1987 | Santangelo et al. | 521/189 |

FOREIGN PATENT DOCUMENTS 21753  1/1987  Japan .

*Primary Examiner*—Lewis T. Jacobs
*Assistant Examiner*—David W. Woodward
*Attorney, Agent, or Firm*—Willard Jones, II; James C. Simmons; William F. Marsh

[57] ABSTRACT

The present invention relates to a binder and a method for making and shaping a green body of ceramic powder and subsequently producing a formed ceramic body. The method of the present invention comprises admixing a ceramic powder with a binder comprising a polyalkylene carbonate to form a ceramic-binder mixture. The binder of the present invention comprises a polyalkylene carbonate, preferably polyethylene carbonate or polypropylene carbonate.

12 Claims, No Drawings

$CO_2$ COPOLYMER CERAMIC-BINDER COMPOSITION

This is a divisional of co-pending application Ser. No. 07/007,233 filed on Jan. 27, 1987.

TECHNICAL FIELD

The present invention relates to a process for the forming of ceramic bodies and to a ceramic-binder composition for use in forming ceramic bodies. More specifically, the present invention relates to the use of a $CO_2$ copolymer, i.e. a polyalkylene carbonate, in the ceramic-binder composition.

BACKGROUND OF THE INVENTION

The ceramic industry depends on the use of binders to facilitate the fabrication of ceramic bodies. In classical ceramic triaxial bodies, the clay acts as the binder to help form the body. However, advanced ceramic bodies, ($ZrO_2$, SiC, $Si_3N_4$, etc.) do not contain clay, and therefore binder materials must be used to impart workability and green strength to ceramic compacts during processing prior to sintering. Those binders used to impart workability must have several key properties including: uniform mixing with the ceramic composition, providing sufficient green strength to allow processing, not decomposing during processing of the green body and complete burn-out during sintering thus leaving minimal residual ash in the sintered body. Of these characteristics the most important is complete burn-out with minimal residual ash. Several processes for forming ceramic bodies and several binder materials have been either proposed or are in use to provide the workability necessary during forming of ceramic bodies, among these are the following.

U.S. Pat. No. 4,608,361 discloses a process for producing a sheet for a catalyst carrier for vapor-phase reaction which comprises mixing highly heat resistant ceramic fibers, organic fibers, and an organic binder to form a slurry, forming the slurry into a paper sheet, impregnating the paper sheet with a silicon compound converting the silicon compound to silica gel and heating the impregnated sheet to burn up the organic fibers and the organic binder.

U.S. Pat. No. 4,551,496 discloses a thermoplastically moldable ceramic composition comprised of from about 40 to about 60 percent by volume of a sinterable silicon carbide powder and a binder comprised of an organic acid and a copolymer of ethylene and from greater than about 12 to about 33 weight percent vinyl acetate, said organic acid having a melting point ranging from about 44° C. to about 88° C. and ranging from greater than about 18 to about 45 weight percent of the binder. The ceramic composition is thermoplastically molded into a body which is baked to remove the binder and then sintered.

U.S. Pat. No. 4,530,808 discloses a sintered SiC body produced by forming a thermoplastically moldable ceramic composition comprised of sinterable silicon carbide powder and binder, thermoplastically molding the ceramic composition into a body, embedding the body in nominally spherical particles having a density greater than 80% of the particle's theoretical density and being selected from the group consisting of polycrystalline silicon carbide, free carbon-coated polycrystalline silicon carbide and mixtures thereof, baking the embedded body to remove the binder therefrom, recovering and sintering the baked body. The binder is comprised of stearic acid and a thermoplastic of ethylene and 25 wt% vinyl acetate.

U.S. Pat. No. 4,496,506 discloses a method for shaping a green body of a ceramic powder by use of a specific organic binder, which is a modified polyvinyl alcohol comprising monomeric units expressed by the formula:

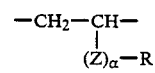

in which R is a monovalent hydrocarbon group having at least 4 carbon atoms, Z is a divalent linking unit of —O— or —O—CO— and $\alpha$ is zero or one, in a limited mole fraction. Due to the strong binding power and lubricity of the binder polymer, the wet blend of ceramic powder with an aqueous solution of the binder has good workability in shaping and wet shaped body has good shape retainability. The shaped body after drying also has excellent mechanical strength to facilitate handling.

U.S. Pat. No. 4,474,731 discloses a process for sintering and densification of ceramic materials containing hydrocarbon materials to produce ceramic bodies substantially free from carbonaceous residues of such hydrocarbon materials by compacting ceramic particles and a binder containing a pyrolysis catalyst selected from the group consisting of nickel and palladium ions, heating in a low oxygen atmosphere to a temperature in the range of 350° to 780° C. to remove the carbonaceous residue and further heating the material to produce a sintered, dense ceramic material.

U.S. Pat. No. 4,353,958 discloses a process for preparation of green ceramic tapes which comprise a finely divided ceramic powder and a water-compatible polyurethane resin binder. The green tapes are prepared by casting a water-based slip containing the ceramic powder and the water-compatible polyurethane resin binder in the form of a tape and then drying the formed tape. The drying is conducted in two stages, in the first a relatively humid atmosphere is maintained, in the second the humidity is reduced.

U.S. Pat. No. 4,346,049 discloses a process for the preparation of pressureless sintered silicon ceramic bodies having an equiaxed microstructure and an alpha crystalline habit. These ceramic bodies are produced by firing shaped bodies containing finely divided silicon carbide, a boron source such as boron carbide, a carbon source such as phenolic resin and a temporary binder such as polyvinyl alcohol at sintering temperatures from about 1900° to about 2250° C. under conditions such that a coating of carbon source is maintained on the finely divided silicon carbide.

U.S. Pat. No. 4,158,688 discloses a sacrificial binder for use in making molded ceramic bodies. The sacrificial binders used in this invention comprise block polymers having the structural formula:

wherein X is the linking group, A or B, $\eta$ is 0 or a positive integer, $\eta'$ is a positive integer greater than 2, A is a linear or branched polymer that is glassy or crystalline at room temperatures and has a softening point in the range from about 80° to about 250° C. and B is polymer different from A that behaves as an elastomer at processing temperatures, a plasticizer which may be oil, wax, or oil and wax, and optionally other components such as supplementary resins, elastomers and antioxidants. Examples of suitable A materials include polystyrene, poly(acrylonitrile) poly(p-bromostyrene) poly(methyl methacrylate), poly(alphamethylsytrene) poly(2-methyl-5-vinylpyridine), poly(4-vinylpyridine), poly(vinyl acetate), polyesters, polyamides, polyurethanes, poly(vinyl chloride), polypropylene, polysulfones, poly(phenylene sulfide) poly(4-methyl pentene-1) and poly(vinyl alcohol). Examples of suitable B materials include polybutadiene, polyisoprene, polydimethylbutadiene, poly(ethylene oxide), poly(isopropyl acrylate), poly(octamethylcyclotetrasiloxane), poly(tetrahydrofuran), polyisobutylene, ethylene propylene rubber, ethylene propylene diene terpolymers, chlorosulfonated polyethylene, epichlorohyrin rubber, butyl rubber, chlorobutyl rubber, bromobutyl rubber, fluorocarbon rubbers and silicone elastomers.

As mentioned earlier, the most important requirement for a binder material is the ability to be completely burned-out while leaving minimal residual ash in the ceramic body. If a binder leaves residual ash this can significantly affect the mechanical, chemical or electrical properties of the ceramic body. Because of this, the burn-out operation is carried out in an oxidizing atmosphere. However, some of the newer ceramic compositions, e.g. $Si_3N_4$ and SiC cannot be exposed to air. Therefore there is a growing need in the ceramic industry for a binder which will decompose in inert or reducing atmospheres. The above processes and binders do not present a practical answer to this need.

SUMMARY OF THE INVENTION

The present invention relates to a method for making and shaping a green body of ceramic powder and subsequently producing a formed ceramic body. The present invention also relates to a ceramic-binder composition suitable for use in shaping green bodies.

Thus, the method of the present invention for shaping a green body of ceramic powder comprises admixing the ceramic powder with a binder comprising a polyalkylene carbonate to produce a ceramic-binder mixture followed by shaping the ceramic-binder mixture into a green body. Subsequently, the shaped green body can be sintered in either an oxidizing atmosphere or a non-oxidizing atmosphere to form a ceramic body. The binder comprising an polyalkylene carbonate can be the polymer itself, the polymer dissolved in an organic solvent, or the polymer in an emulsion with either water or an organic, e.g. an alcohol. If the binder is not the polymer itself, then the ceramic-binder mixture must be dried to produce a free-flowing powder prior to shaping the mixture into a green body.

The ceramic-binder composition of the present invention comprises a polyalkylene carbonate and a ceramic powder. As mentioned above, the polyalkylene carbonate can be the polymer itself, the polymer dissolved in an organic solvent, or the polymer in an emulsion with either water or an organic, e.g. an alcohol.

DETAILED DESCRIPTION OF THE INVENTION

In the method of the present invention, a ceramic powder is admixed with a binder comprising a polyalkylene carbonate. For the present method any ceramic powder is usable in the process, i.e. the oxide-based powders such as alumina, silica, titania, zirconia, cordierite, forsterite, titanates, ferrites, steatite and the like or the non-oxide-based materials like silicon carbide, silicon nitride and the like known in the ceramic arts. The process is particularly suited for ceramic powders which should not be exposed to an oxidizing atmosphere, e.g. $Si_3N_4$ and SiC, at elevated temperatures because the binder composition of the present invention can be burned-out in a non-oxidizing atmosphere.

In the process, the binder content added to the ceramic powder may be as low as 0.1 weight percent and as high as 60 weight percent based on the polymer in the binder. Typical binder contents range between 0.5 weight percent and 15 weight percent. The amount of binder in the mixture will somewhat depend on the method used for shaping the green body.

The binder composition used in the method of the present invention is any polyalkylene carbonate. The binder can be either the polymer itself, the polymer dissolved in an organic solvent, or the polymer in an emulsion with water or an organic, e.g. an alcohol. Preferably, the polyalkylene carbonate is one containing less than 100 ppm of a metallic catalyst residue, and more preferably, one containing less than 15 ppm of a metallic catalyst residue. Although any polyalkylene carbonate can be used in the method, the preferred polyalkylene carbonates for the method and the binder composition are polypropylene carbonate and polyethylene carbonate. A detailed discussion concerning the preparation of and the possible types of polyalkylene carbonates can be found in Chapter 4, "Synthesis of Macromolecules from Carbon Dioxide" of *Organic and Bio-organic Chemistry of Carbon Dioxide*, S. Inoue and N. Yamazaki, John Wiley and Sons, c. 1982, the text of which is incorporated herein by reference. In addition to the previous article, four methods of production are disclosed in U.S. Pat. Nos. 4,166,898; 3,953,383; 3,900,424; and 3,706,713, likewise, the specifications of these patents are incorporated herein by reference.

After the ceramic powder has been thoroughly admixed with the binder comprising a polyalkylene carbonate and ceramic-binder mixture has been produced, the mixture is ready to be shaped. However, if the binder used in the method of the present invention is an organic solution of the polyalkylene carbonate or an emulsion of the polyalkylene carbonate, then the ceramic-binder mixture should be dried to produce a free-flowing powder prior to shaping the ceramic-binder mixture. Any conventional procedure, e.g. extrusion molding, injection molding, tape shaping, compression molding, slip casting and the like, is applicable to the shaping of the ceramic-binder mixture into a formed green body.

Once the green body has been shaped, the green body can be sintered either in an oxidizing atmosphere, e.g. air, or a non-oxidizing atmosphere, e.g. argon, helium, hydrogen or nitrogen for a period of time necessary to burn-out the polyalkylene carbonate binder resulting in a formed ceramic body.

Because they decompose cleanly, via an unzipping mechanism to produce cyclic carbonates, polyalkylene carbonates do not require oxygen for effective removal. This unique characteristic allows their ready removal from ceramic bodies in oxidizing or non-oxidizing atmospheres. Gas volumes produced upon unzipping are substantially less than if combustion to carbon dioxide and water occurred, thus significantly reducing burn-out times.

The binder and the method of the present invention is illustrated further by way of following examples.

EXAMPLE 1

Two samples, approximately one gram each, of polypropylene carbonate were decomposed at 400° C. in air and argon atmospheres, respectively. The sample decomposed in air had a residual ash content of less than 0.058 wt% while the sample decomposed in argon had a residual ash of less than 0.13 wt%. This example demonstrates the clean decomposition characteristics of polyalkylene carbonates.

EXAMPLE 2

A 0.536 gram sample of polypropylene carbonate was dissolved in 15 ml of methylene chloride by stirring for five minutes. To this solution was added 26.82 grams of alumina (average particle size 27μ) and the mixture was allowed to evaporate. The resulting material, containing approximately 2 wt% polymer in the alumina, was passed through a 230 mesh screen and pressed into 1" diameter×3/16" thick compacts at various pressures. The characteristics of the compacts are given below:

| Binder | Pressing Force (lbs) | Density (gm/cm$^3$) | % Theoretical Density ($Al_2O_3$ = 3.986 gm/cm$^3$) | Characteristics |
|---|---|---|---|---|
| None | 5000 | * | — | No green strength |
| 2 wt % | 5000 | 2.097 | 52.59 | Good green strength |
| None | 10000 | 2.112 | 52.98 | Very little green strength |
| 2 wt % | 10000 | 2.145 | 53.82 | Good green strength |
| None | 15000 | 2.210 | 55.45 | Very little green strength |
| 2 wt % | 15000 | 2.300 | 57.70 | Good green strength |

*Sample fell apart

EXAMPLE 3

A. A 1.01 gram sample of polypropylene carbonate was dissolved in 20 mls. of methylene chloride by stirring at room temperature for approximately ten minutes. To this solution was added 50 grams of high purity ceramic grade alumina. After the solvent had all been evaporated, the dried mixture was broken up and passed through a 100 mesh screen. The resulting material contained 2 wt% binder.

B. A 1.005 gram sample of polyvinyl alcohol was dissolved in 40 ml of water at 80° C. To this solution was added 50 grams of high purity ceramic grade alumina followed by evaporation of the water and drying. The dried mixture was broken up and passed through a 100 mesh screen.

C. A 1.07 gram sample of methylcellulose was dissolved in 20 ml of water at 80° C. When the polymer had dissolved, 20 ml of cold water was added and the mixture stirred for 30 minutes. To the resulting solution was added 50 grams of high purity ceramic grade alumina followed by evaporation of the water and drying. The dried solid was broken up and passed through a 100 mesh screen.

D. A 50 gram sample of high purity ceramic grade alumina was passed through a 100 mesh screen.

All of the above samples were pressed into compacts by placing 5 gram samples in a one-inch diameter die and pressing at 15000 lbs. The green densities of the resulting compacts were measured and are given below:

| Binder | Pressing Force (lbs) | Density (gm/cm$^3$) | % Theoretical Density ($Al_2O_3$ = 3.986 gm/cm$^3$) |
|---|---|---|---|
| None | 15000 | 2.223 | 55.8 |
| 2 wt % polyvinyl alcohol | 15000 | 2.240 | 56.2 |
| 2 wt % methylcellulose | 15000 | 2.256 | 56.7 |
| 2 wt % polypropylene carbonate | 15000 | 2.290 | 57.4 |

EXAMPLE 4

The green compacts prepared as outlined in Example 3 were sintered in air at 1550° C. for 120 minutes. Heating and cooling ramps were 2° C./minute. Properties of the sintered compacts are given below:

| Binder | Density (gm/cm$^3$) | % Theoretical Density ($Al_2O_3$ = 3.986 gm/cm$^3$) | Characteristics |
|---|---|---|---|
| None | 3.922 | 98.40 | Sintered compact exhibited stress cracks |
| 2 wt % polyvinyl alcohol | 3.936 | 98.75 | Good integrity |
| 2 wt % methylcellulose | 3.903 | 97.91 | Good integrity |
| 2 wt % polypropylene carbonate | 3.973 | 99.68 | Good integrity |

Note: The term "good integrity" means that the ceramic body has good surface smoothness and does not show any signs of stress cracks.

EXAMPLE 5

The green compacts fabricated as outlined in Example 3 were sintered in an argon atmosphere at 1550° C. for 120 minutes. Heating and cooling ramps were 2° C./minute. The properties of the sintered compacts are given below:

| Binder | Density (gm/cm$^3$) | % Theoretical Density ($Al_2O_3$ = 3.986 gm/cm$^3$) | Characteristics |
|---|---|---|---|
| None | 3.985 | 99.19 | Sintered compacts exhibited stress cracks |
| 2 wt % polyvinyl alcohol | 3.948 | 99.04 | Good integrity |
| 2 wt % methylcellulose | 3.919 | 98.32 | Good integrity |
| 2 wt % polypropylene carbonate | 3.976 | 99.76 | Good integrity |

EXAMPLE 6

The green compacts fabricated as outlined in Example 3 were sintered in a helium atmosphere at 1550° C. for 120 minutes. Heating and cooling ramps were 2° C./minute. The properties of the sintered compacts are given below:

| Binder | Density (gm/cm³) | % Theoretical Density (Al₂O₃ = 3.986 gm/cm³) | Characteristics |
|---|---|---|---|
| None | 3.912 | 98.16 | Sintered compacts exhibited stress cracks |
| 2 wt % polyvinyl alcohol | 3.925 | 98.48 | Good integrity |
| 2 wt % methylcellulose | 3.921 | 98.36 | Good integrity |
| 2 wt % polypropylene carbonate | 3.967 | 99.53 | Good integrity |

EXAMPLE 7

Green compacts fabricated as outlined in Example 3 were sintered in a nitrogen atmosphere at 1550° C. for 120 minutes. Heating and cooling ramps were 2° C./minute. The properties of the sintered compacts are given below:

| Binder | Density (gm/cm³) | % Theoretical Density (Al₂O₃ = 3.986 gm/cm³) | Characteristics |
|---|---|---|---|
| None | 3.959 | 99.31 | Sintered compacts exhibited stress cracks |
| 2 wt % polyvinyl alcohol | 3.940 | 98.85 | Good integrity |
| 2 wt % methylcellulose | 3.946 | 99.06 | Good integrity |
| 2 wt % polypropylene carbonate | 3.973 | 99.68 | Good integrity |

As can be seen from the above examples, the present invention solves binder burn-out problems because the polyalkylene carbonates are shown to burn-out to better than 99.9 weight percent in oxidizing atmospheres and to about 99.9 weight percent in inert atmospheres. Additionally, by providing a binder material which can be completely decomposed in inert atmospheres, the volume of gas products produced by the sintering step is markedly reduced compared to the volumes produced on combustion in air. This reduction in gas volume produced during sintering directly decreases the possibility of flaw generation during burn-out and hence increases the probability of obtaining crack-free ceramic bodies. Finally, because of the clean burn-out of the binder composition and the ability to use non-oxidizing atmospheres, thicker ceramic bodies can be formed.

The present invention has been described with reference to a preferred embodiment thereof. However, this embodiment should not be considered a limitation on the scope of the invention, which scope should be ascertained by the following claims.

We claim:

1. A ceramic-binder composition suitable for shaping into a green body, said ceramic-binder composition comprising a polyalkylene carbonate and a ceramic powder, wherein the polyalkylene carbonate is present in the ceramic-binder composition in an amount from 0.5 wt% to 15 wt% and the polyalkylene carbonate and ceramic powder are admixed.

2. The ceramic-binder composition of claim 1, wherein said polyalkylene carbonate is polypropylene carbonate.

3. The ceramic-binder composition of claim 1, wherein said polyalkylene carbonate is polyethylene carbonate.

4. The ceramic-binder composition of claim 1, wherein said polyalkylene carbonate is in a solution of an organic solvent and the polyalkylene carbonate.

5. The ceramic-binder composition of claim 4, wherein said organic solvent is methylene chloride.

6. The ceramic-binder composition of claim 1, wherein said polyalkylene carbonate is in an emulsion of the polyalkylene carbonate with water.

7. The ceramic-binder composition of claim 1, wherein said polyalkylene carbonate is in an emulsion of the polyalkylene carbonate with an alcohol.

8. The ceramic-binder composition of claim 1, wherein said ceramic powder is selected from the group consisting of alumina, silica, titania, zirconia, cordierite, forsterite, titanates, ferrites, steatite, silicon carbide and silicon nitride.

9. The ceramic-binder composition of claim 2, wherein said ceramic powder is selected from the group consisting of alumina, silica, titania, zirconia, cordierite, forsterite, titanates, ferrites, steatite, silicon carbide and silicon nitride.

10. The ceramic-binder composition of claim 4, wherein said ceramic powder is selected from the group consisting of alumina, silica, titania, zirconia, cordierite, forsterite, titanates, ferrites, steatite, silicon carbide and silicon nitride.

11. The ceramic-binder composition of claim 6, wherein said ceramic powder is selected from the group consisting of alumina, silica, titania, zirconia, cordierite, forsterite, titanates, ferrites, steatite, silicon carbide and silicon nitride.

12. The ceramic-binder composition of claim 7, wherein said ceramic powder is selected from the group consisting of alumina, silica, titania, zirconia, cordierite, forsterite, titanates, ferrites, steatite, silicon carbide and silicon nitride.

* * * * *